United States Patent
Duluk et al.

(10) Patent No.: US 9,162,924 B2
(45) Date of Patent: Oct. 20, 2015

(54) MOISTURE WICKING MORTAR WITH MICROTUBES

(71) Applicants: Sophia Elizabeth Duluk, Palo Alto, CA (US); Lauren Kathleen Garvey, Oak Lawn, IL (US)

(72) Inventors: Sophia Elizabeth Duluk, Palo Alto, CA (US); Lauren Kathleen Garvey, Oak Lawn, IL (US)

( * ) Notice: Subject to any disclaimer, the term of this patent is extended or adjusted under 35 U.S.C. 154(b) by 0 days.

(21) Appl. No.: 14/315,148

(22) Filed: Jun. 25, 2014

(65) Prior Publication Data
US 2015/0000567 A1  Jan. 1, 2015

Related U.S. Application Data
(60) Provisional application No. 61/957,304, filed on Jun. 28, 2013.

(51) Int. Cl.
| | |
|---|---|
| C04B 20/00 | (2006.01) |
| C04B 28/10 | (2006.01) |
| C04B 111/00 | (2006.01) |
| C04B 111/20 | (2006.01) |

(52) U.S. Cl.
CPC ............ *C04B 20/0056* (2013.01); *C04B 28/10* (2013.01); *C04B 2111/00284* (2013.01); *C04B 2111/29* (2013.01); *Y02W 30/97* (2015.05)

(58) Field of Classification Search
CPC .................................................. C04B 38/0054
See application file for complete search history.

(56) References Cited

U.S. PATENT DOCUMENTS

| | | | | |
|---|---|---|---|---|
| 4,340,510 A | * | 7/1982 | Howanietz et al. | 524/5 |
| 8,551,243 B2 | | 10/2013 | Montoya et al. | |
| 2013/0104775 A1 | * | 5/2013 | Binhussain et al. | 106/638 |
| 2013/0276674 A1 | * | 10/2013 | Korzhenko et al. | 106/804 |

* cited by examiner

*Primary Examiner* — Paul Marcantoni

(57) ABSTRACT

A novel mortar mix and mortar formed therewith. The mortar contains sand, lime, cement and microtubes in a mixture thereof. The microtubes assist in wicking moisture directly through a wet mortar compound formed by adding water to the mortar mix. Wicking moisture directly through the mortar decreases the reliance on a continuous, unobstructed cavity behind the masonry wall, as well as prevent cracking from water's freeze-thaw cycle. It also allows water to pass through the mortar in a similar manner as the masonry, creating two in-sync cycles, rather then two disparate cycles for water flow. In various embodiments, the microtubes could be composed of cellulose, fabricated polymer or graphite.

20 Claims, 7 Drawing Sheets

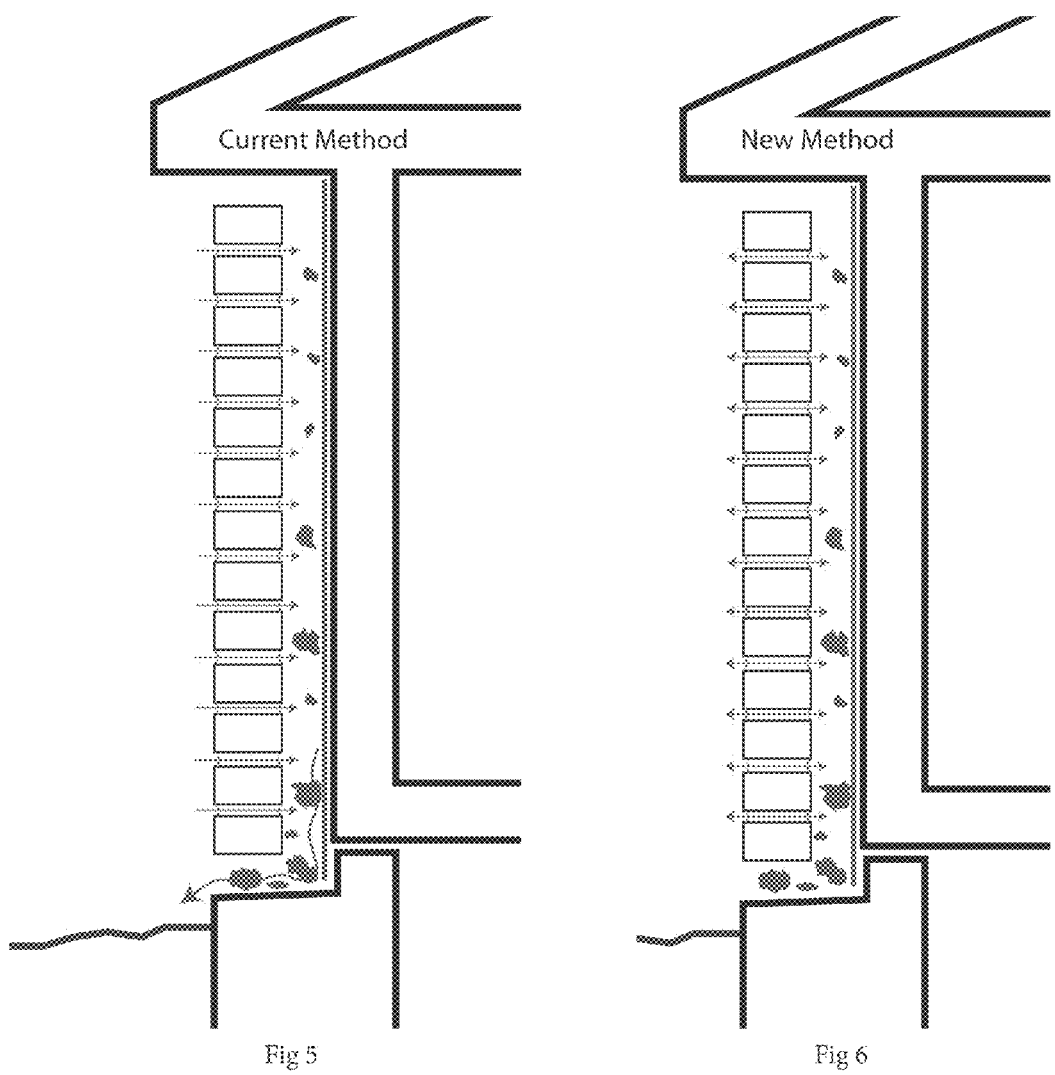

MOISTURE WICKING MORTAR WITH MICROTUBES

REFERENCE TO RELATED APPLICATION

The present patent application claims benefit to provisional patent application, Ser. No. 61/957,304, filed on Jun. 28, 2013, entitled "Moisture Wicking Motor with Microtubes," which is hereby incorporated by reference herein.

BACKGROUND OF THE INVENTION

1. Field of the Invention

Embodiments of the present invention relate generally to building construction using masonry and mortar, and, more specifically, to techniques for wicking moisture out of the mortar.

2. Description of Related Art

Masonry (e.g., stone, bricks, or concrete masonry units) is a reservoir material, absorbing water and retaining it in its porous structure. To counteract this, construction practices have moved towards allowing for small openings on the bottom of the wall, as shown in FIGS. 1 through 4, to create a ventilated cavity behind the masonry veneer. Often this cavity, usually less then 2 inches wide, is blocked by residual mortar fallen during construction, and the small vents can be blocked by dirt and pests. Not allowing water to escape can cause pressure build up behind the wall, causing bricks to spall. Excess moisture can cause condensation in both the masonry and the wall cavity causing mold, structural, and cosmetic damage.

Water can move through bricks via capillary action and its inherent porous nature. However, mortar does not have these same abilities, and water often relies on cracks in the mortar to pass through. The mortar used today is made from lime, cement, and sand, which dries into a very rigid mixture, unlike the lime putty and sand used before 1930. The new type of mortar does not expand and contract with moisture increase and temperature change like its pre-1930s counterpart. Instead, the moisture retained in the mortar goes through a freeze thaw cycle in which the frozen water expands, causing movement and cracking in the mortar over time.

SUMMARY OF THE INVENTION

Moisture Wicking Mortar (MWM) is made from lime, sand, microtubes, cement and water. These components create a matrix of microtubes to draw water through the mortar, analogous to water movement in plants. The tubular structure of the microtubes allows for capillary action to drain the moisture to the exterior of a wall on a molecular level. The microtubes can be treated with a waterproofing similar to that found in athletic wear before the mixture was created, in order to decrease absorption by the microtubes while increasing the capillary action. The microtubes can be made of cellulose, any fabricated polymer, or graphite.

Wicking moisture directly through the mortar would decrease the reliance on a continuous, unobstructed cavity behind the masonry wall, as well as prevent cracking from water's freeze-thaw cycle. It would also allow water to pass through the mortar in a similar manner as the masonry, creating two in-sync cycles, rather then two disparate cycles for water flow.

In one embodiment, the present invention is directed to a dry mortar mix comprising: lime; sand; cement; and microtubes mixed in with the lime, sand and cement, wherein said microtubes assist in wicking moister from a wet mortar formed by mixing water with said dry mortar mix. In the dry mortar mix as described above, the microtubes may comprise cellulose. In the dry mortar mix of above, the microtubes may comprise a fabricated polymer. In the dry mortar mix of above, the microtubes may comprise graphite. In the dry mortar mix of above, the microtubes may be treated with a waterproofing agent prior to being mixed with said lime, said sand and said cement.

In another embodiment of the present invention, a process is described for making a dry mortar mix, the process comprising: obtaining lime, sand, cement and microtubes; and forming said dry motor mix by mixing together said lime, said sand, said cement and said microtubes, wherein said microtubes assist in wicking moister from a wet mortar formed by mixing water with said dry mortar mix. In the process described above, the microtubes could comprise celluose, a fabricated polymer or graphite. In the process of above, it may include treating the microtubes with a waterproofing agent prior to the mixing with said lime, said sand and said cement.

BRIEF DESCRIPTION THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is the prior art diagram showing water coming in through the mortar, moving down the gap between the masonry wall and the interior wall, and draining through potentially blocked weep holes at the bottom.

FIG. 6 is the present invention approach of having water move in and out through the mortar, thereby not requiring drainage at the base of the masonry wall.

DETAILED DESCRIPTION

Moisture Wicking Mortar (MWM), in accordance with embodiments of the present invention, is made from lime, sand, microtubes, cement and water. These components create a matrix of microtubes to advantageously draw water through the mortar, analogous to water movement in plants. The tubular structure of the microtubes allows for capillary action to drain the moisture to the exterior of a wall on a molecular level. The microtubes can be treated with a waterproofing similar to that found in athletic wear before the mixture was created, in order to decrease absorption by the microtubes while increasing the capillary action. The microtubes can be made of cellulose, any fabricated polymer (e.g., polyester and nylon), or graphite.

Figure 1:
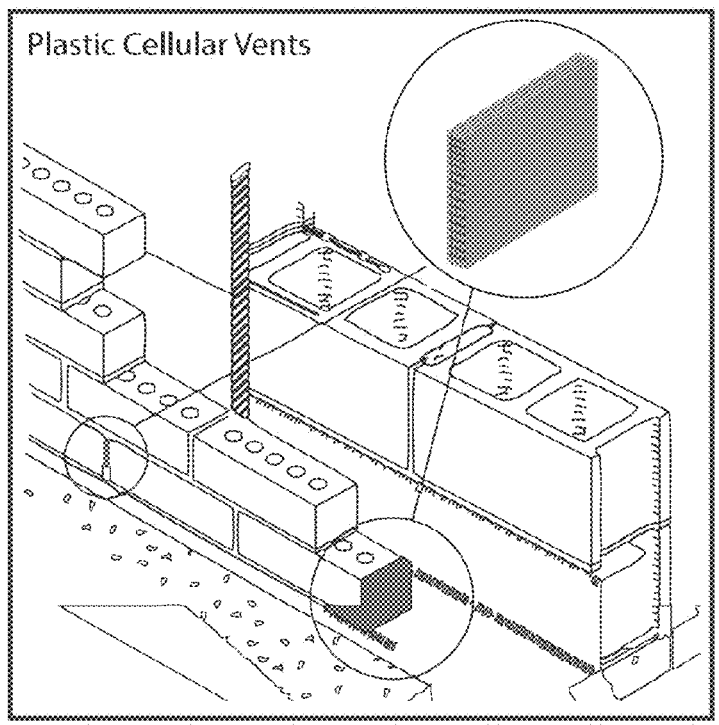
FIG. 1 is the prior art for weep holes, which allow water to drain at the base of a masonry wall
Figure 2:
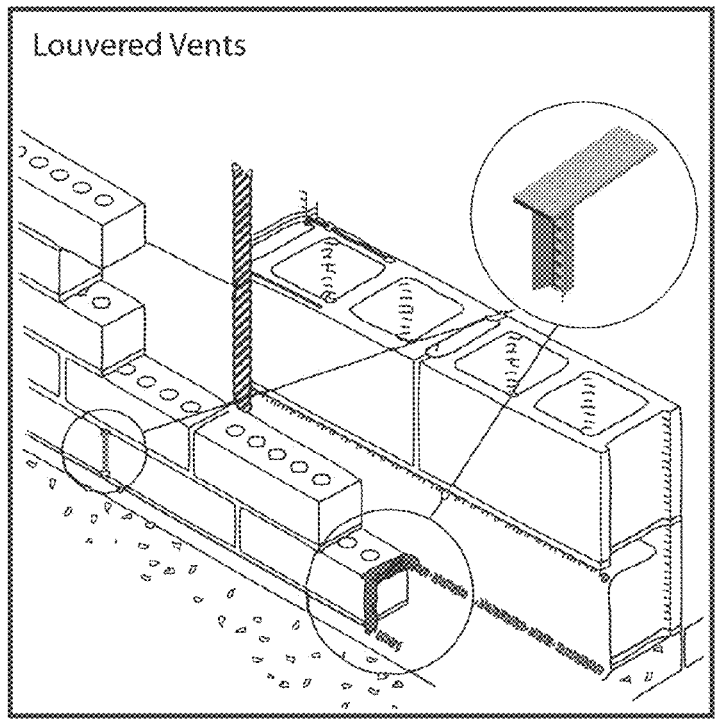
FIG. 2 is the prior art for louvered vents, which allow water to drain at the base of a masonry wall.
Figure 3:
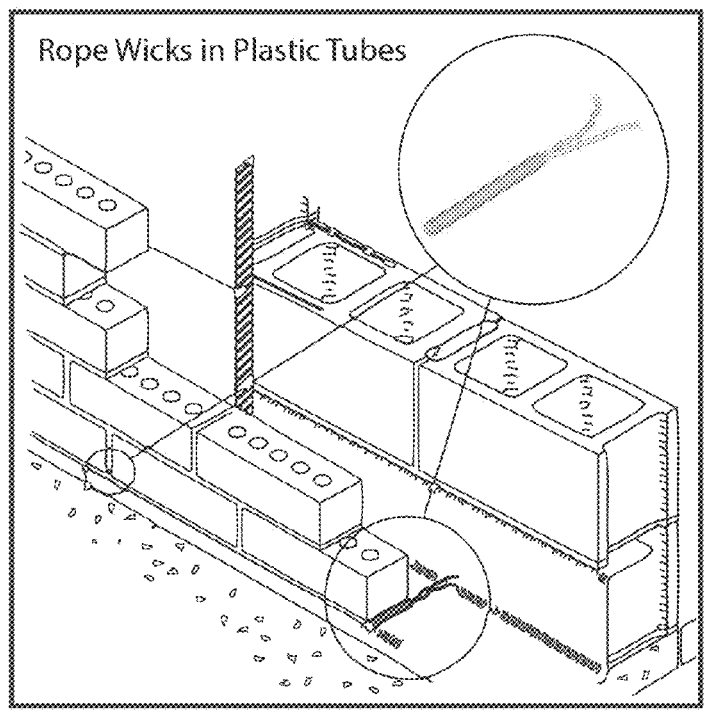
FIG. 3 is the prior art for rope wicks in plastic tubes, which allow water to drain at the base of a masonry wall.
Figure 4:
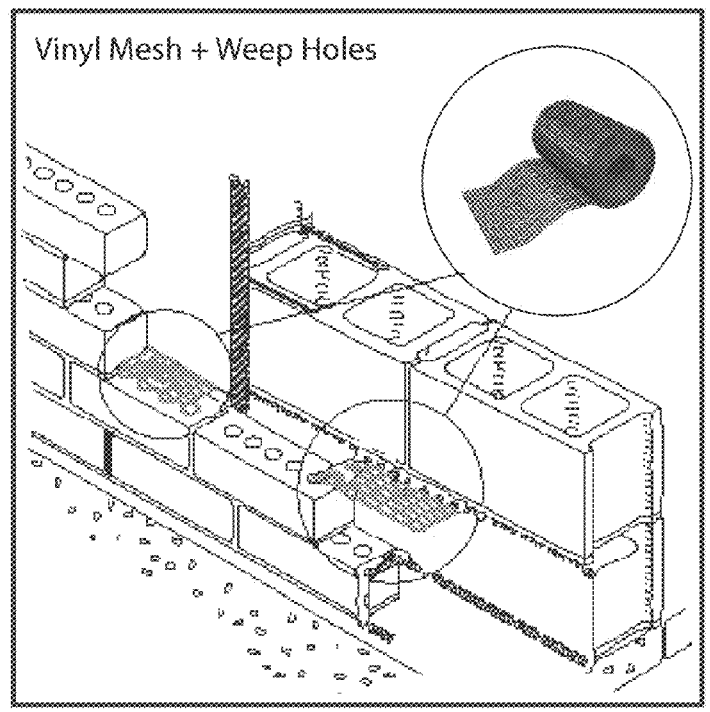
FIG. 4 is the prior art for vinyl mesh and weep holes, which allow water to drain at the base of a masonry wall.
Figure 7:
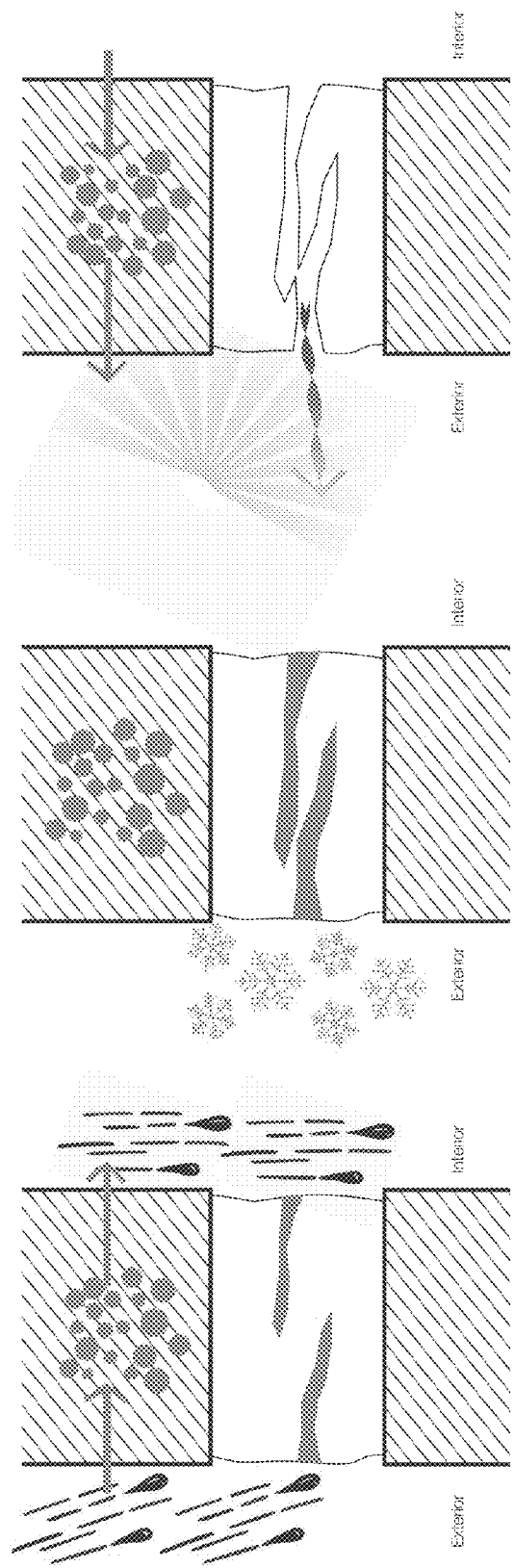
FIG. 7 shows the freeze-thaw cycle of prior art techniques.
Figure 8:
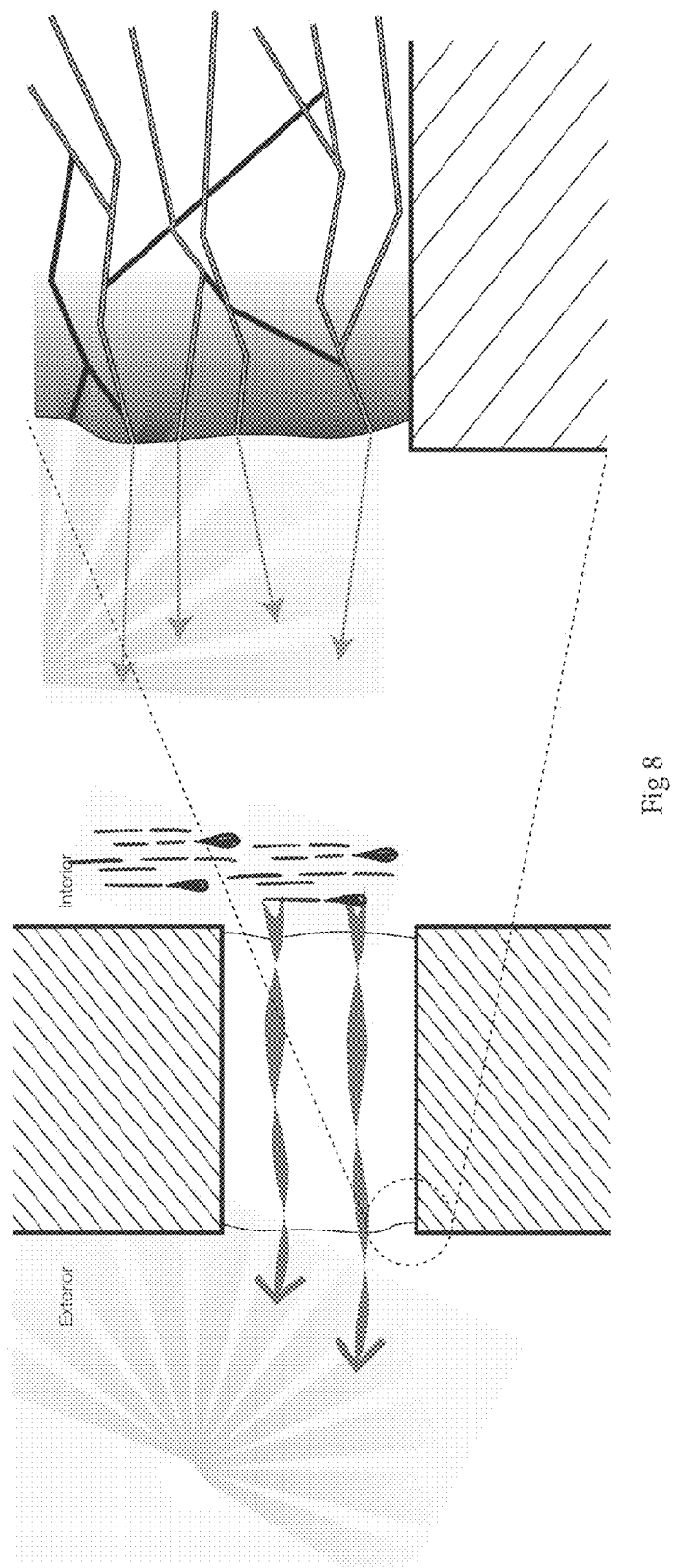
FIG. 8 shows a matrix of microtubes through which water is drawn out of the mortar.

Wicking moisture directly through the mortar would decrease the reliance on a continuous, unobstructed cavity behind the masonry wall, as well as prevent cracking from water's freeze-thaw cycle, as shown in FIGS. 7 and 8. It would also allow water to pass through the mortar in a similar manner as the masonry, creating two in-sync cycles, rather then two disparate cycles for water flow.

Figure 9:
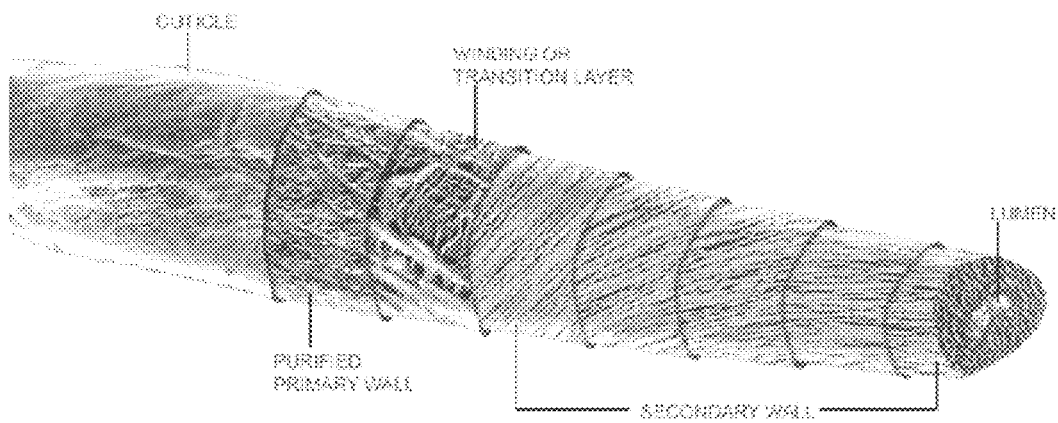
FIG. 9 shows plant cellulose from which microtubes can be extracted.
Figure 10:
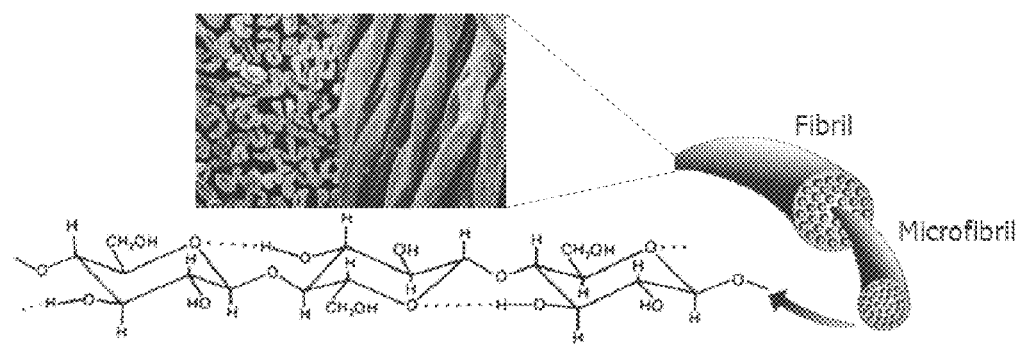
FIG. 10 shows a composition of plant-based cellulose microtubes.

Cellulose is the most abundant natural resource, and is a stable, physiologically inert polysaccharide. Cellulose microtubes are a good choice because they already exist in nature and are a widely available inexpensive polymer, as shown in FIGS. 9 and 10. In plants, cellulose is used to draw water and nutrients through the structure. This biomimicry creates the water-drawing wicking action that the mortar utilizes.

Cellulose microtubes are extracted from softwood pulp, straw, or cotton, which can be done with an acid-based process, as known in the art. Cellulose microtubes can be in the range of 10 μm to 300 μm They are often produced with raw materials, but new research shows similarly sized tubes can be made from sawdust and wood trimmings.

Similar to sports fabrics, MWM is designed to increase the flow of moisture; minimizing the time potentially harmful water molecules spend in the mortar. MWM uses a complex matrix, as shown in FIG. 8, of microtubes combined with a sun-activated additive to draw moisture through the mortar, rather then allowing it to be retained by the mortar.

The moisture drainage diagrams in FIGS. 5 and 6 respectively show the prior art and innovative paths of moisture in a brick veneer wall assembly. Typical wall cavities fill with mortar residue, which blocks the path of drainage. MWM, the innovative method, promotes moisture movement through the mortar in the entire wall assembly, decreasing the reliance on quality control of the installation of the masonry. Weep holes must be placed 24 inches on center, but MWM is embedded in the mortar, and therefore, weep holes are not needed for moisture control. As shown in FIG. 6, water wicking double headed arrows illustrate moisture is wicked out from the mortar as it sets up, the moisture being wicked out in between each of the masonry elements, e.g., bricks.

The tubes can cross one another because the water could travel on the interior or along the exterior of the tubes, through the concrete. Water tends to adhere to concrete, so giving it another surface to stick to would allow the water to more easily move through the concrete.

Figure 11:
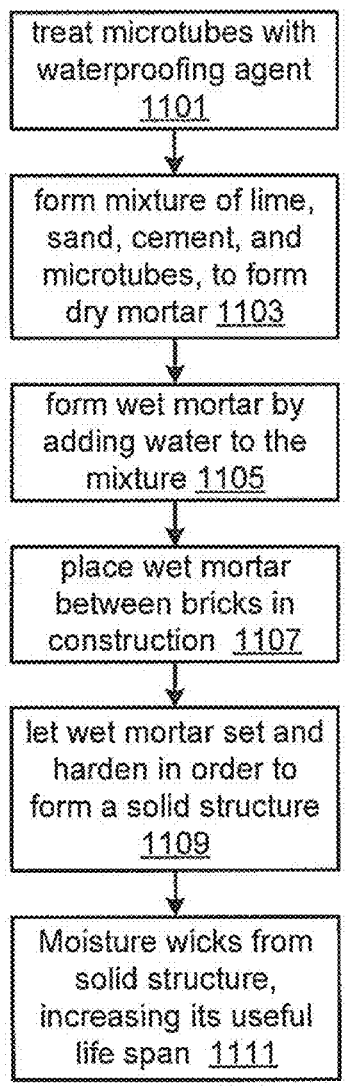
FIG. 11 illustrates a process of making a wet mortar mix in accordance with embodiments of the present invention.

FIG. 11 illustrates a process of making a mortar mix in accordance with embodiments of the present invention. At 1101 the microtubes can optionally be treated with a waterproofing agent. At 1103, the lime, sand, cement and microtubes are first obtained. The microtubes, lime, cement and sand are then mixed together to form a dry mortar mix. At 1105, when the dry mortar mix is mixed with water to form a wet mortar, the microtubes assist in wicking moisture directly through the wet mortar as it sets up in addition to the other benefits described herein. At 1107, the wet mortar is placed between bricks in a mason wall or other structure. At 1109, the wet mortar is allowed to set. As stated above, at 1111, the microtubes assist is wicking out the moisture from the solid structure increasing the useful lifespan of the mason structure.

We claim:

1. A mortar mix comprising:
   lime;
   sand;
   cement; and
   microtubes mixed in with the lime, sand and cement.

2. The mortar mix of claim 1, wherein:
   the microtubes comprise cellulose.

3. The mortar mix of claim 1, wherein:
   the microtubes comprise a fabricated polymer.

4. The mortar mix of claim 1, wherein:
   the microtubes comprise graphite.

5. The mortar mix of claim 1, wherein the microtubes are treated with a waterproofing agent prior to being mixed with said lime, said sand and said cement.

6. A process for making a dry mortar mix, said process comprising:
   obtaining lime, sand, cement and microtubes; and
   forming said dry motor mix by mixing together said lime, said sand, said cement and said microtubes, wherein said microtubes assist in wicking moister from a wet mortar formed by mixing water with said dry mortar mix.

7. The process of claim 6, wherein:
   the microtubes comprise cellulose.

8. The process of claim 6, wherein:
   the microtubes comprise a fabricated polymer.

9. The process of claim 6, wherein:
   the microtubes comprise graphite.

10. The process of claim 6, further comprising treating the microtubes with a waterproofing agent prior to the mixing with said lime, said sand and said cement.

11. A dry mortar mix comprising:
    lime;
    sand;
    cement; and
    microtubes mixed in with the lime, sand and cement, wherein said microtubes assist in wicking moister from a wet mortar formed by mixing water with said dry mortar mix.

12. The dry mortar mix of claim 11, wherein:
    the microtubes comprise cellulose.

13. The dry mortar mix of claim 11, wherein:
    the microtubes comprise a fabricated polymer.

14. The dry mortar mix of claim 11, wherein:
    the microtubes comprise graphite.

15. The dry mortar mix of claim 11, wherein the microtubes are treated with a waterproofing agent prior to being mixed with said lime, said sand and said cement.

16. The dry mortar mix of claim 12 wherein the cellulose microtubes are within the range of 10-300 micrometers in size.

17. The dry mortar mix of claim 11 wherein the microtubes are mixed with a sun-activated additive to draw moisture through the wet mortar.

18. The dry mortar mix of claim 12 wherein the microtubes are mixed with a sun-activated additive to draw moisture through the wet mortar.

19. The dry mortar mix of claim 13 wherein the microtubes are mixed with a sun-activated additive to draw moisture through the wet mortar.

20. The dry mortar mix of claim 14 wherein the microtubes are mixed with a sun-activated additive to draw moisture through the wet mortar.

* * * * *